Patented July 17, 1934

1,966,788

UNITED STATES PATENT OFFICE 1,966,788

ISATIN DERIVATIVE

Walter G. Christiansen, Glen Ridge, N. J., and Sidney E. Harris, Brooklyn, N. Y., assignors to E. R. Squibb & Sons, Brooklyn, N. Y., a corporation of New York No Drawing. Application March 12, 1932, Serial No. 598,532

7 Claims. (Cl. 260—48)

This invention relates to derivatives of the poly hydroxy-aryl isatins. More particularly, the invention relates to derivatives of the dihydroxy-aryl isatins which are valuable as intermediate products in the preparation of compounds having valuable therapeutic properties, such as intermediates in which bromine or a nitro group occurs in a position ortho to the OH radical of an hydroxy-aryl group.

In the isatin derivatives of this invention two hydroxy-aryl groups are linked to that carbon atom of isatin which is linked to the benzene nucleus. Each of these aryl groups contains one or more hydroxyl groups. More particularly the invention relates to derivatives of diphenol isatin and derivatives of diresorcin isatin.

This invention includes substituted diphenol isatins which may be represented by the following general formula:

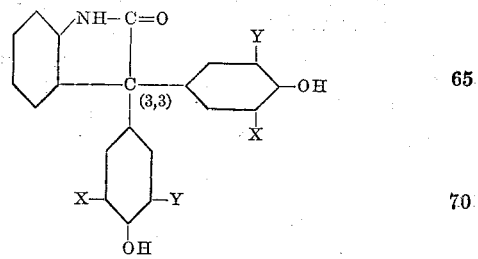

In the above formula "X" may represent hydrogen and "Y" may be a halogen or a nitro group. The following compounds are representative:

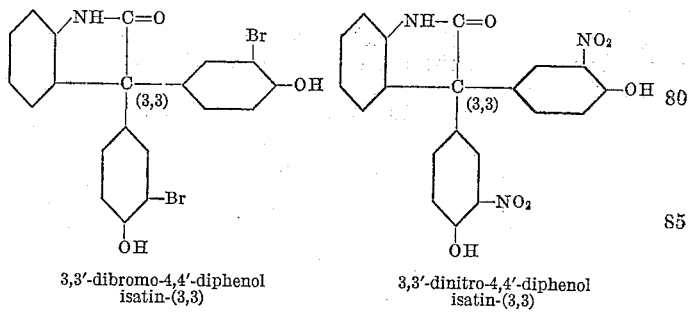

3,3'-dibromo-4,4'-diphenol isatin-(3,3)

3,3'-dinitro-4,4'-diphenol isatin-(3,3)

Moreover "X" may be a halogen or the nitro group, and "Y" may be an alkyl group or an aryl group, as for example:

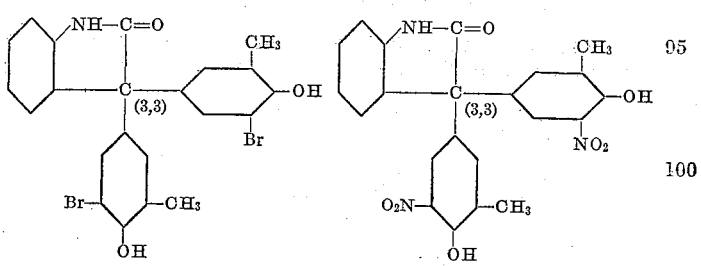

3,3'-dibromo-5,5'-dimethyl-4,4'-diphenol isatin-(3,3)

3,3'-dinitro-5,5'-dimethyl-4,4'-diphenol isatin-(3,3)

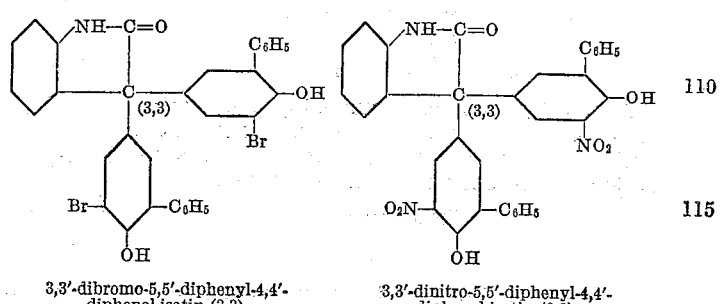

3,3'-dibromo-5,5'-diphenyl-4,4'-diphenol isatin-(3,3)

3,3'-dinitro-5,5'-diphenyl-4,4'-diphenol isatin-(3,3)

Moreover, both "X" and "Y" may be halogens as for example:

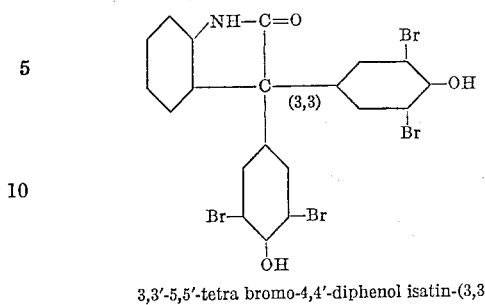

3,3'-5,5'-tetra bromo-4,4'-diphenol isatin-(3,3)

Diresorcin isatin can exist in the "open" or "closed" condition as represented by the following formulæ:

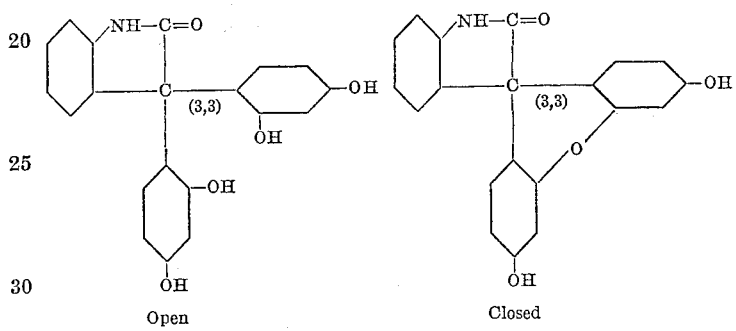

Open          Closed

This invention includes substituted resorcin derivatives of both the open and the closed type. The following formula is representative of the substituted diresorcin isatins of the open type:

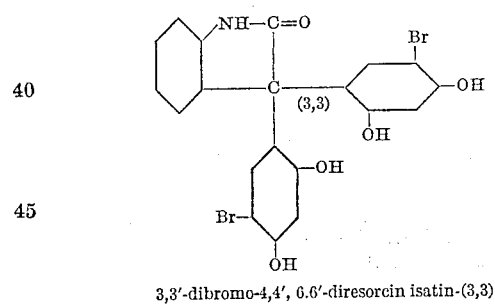

3,3'-dibromo-4,4', 6.6'-diresorcin isatin-(3,3)

The following formula is representative of the substituted diresorcin isatins of the closed type:

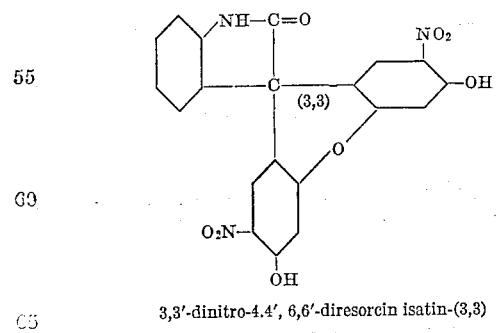

3,3'-dinitro-4.4', 6,6'-diresorcin isatin-(3,3)

Methods by which compounds included by this invention may be prepared are given below but it is intended, and is to be understood that the invention is not limited by these methods.

EXAMPLE 1

*3,3'-dibromo-4,4'-diphenol isatin-(3,3)*

3.17 gms. of diphenol isatin is suspended in 40 cc. of glacial acetic acid and a solution of 3.2 gms. of bromine in 10 cc. of glacial acetic acid is slowly added to the well-stirred suspension. This mixture which has become homogeneous during the addition of the bromine and acid is warmed on a water bath for a short time and is then diluted with 500 cc. of water. The dibromo diphenol isatin which precipitates is washed free of acid by means of water and dried in a vacuum. On recrystallization from hot benzene a fine powder is obtained which has a melting point of 131–132° C. It is very soluble in alcohol, ether and other organic solvents.

EXAMPLE 2

*3,3-5,5'-tetrabromo-4,4'-diphenol isatin-(3,3)*

6.3 gms. of diphenol isatin are dissolved in 80 cc. of alcohol and 13 gms. of bromine are slowly added drop by drop with stirring. The reaction mixture is allowed to cool, and is filtered when quite cold. The tetrabromo diphenol isatin which is thus obtained is washed with alcohol and dried in a vacuum. It may be used as an intermediate in various reactions without further purification. The compound is a white granular micro-crystalline substance which dissolves in diluted alkalies, but not in water. On heating above 270° C. it decomposes without melting.

EXAMPLE 3

*3,3'-dinitro-4,4'-diphenol isatin-(3,3)*

3.17 gms. of diphenol isatin are suspended in 25 cc. of glacial acetic acid. 1.5 cc. of nitric acid (specific gravity 1.4) are added with brisk stirring. The diphenol isatin rapidly dissolves and the deep orange solution is warmed for a short time on a water bath. The solution is then diluted with 400 cc. of water and 5 gms. of sodium chloride are added to coagulate the product. The nitro derivative thus obtained is filtered off, washed with water and dried in a vacuum. After recrystallization from alcohol it forms a yellow powder which melts at 225° C. with decomposition.

EXAMPLE 4

*3,3'-dibromo-5,5'-dimethyl-4,4'-diphenol isatin-(3,3)*

13 gms. of di-ortho cresol isatin are dissolved in 125 cc. of glacial acetic acid and 13 gms. of bromine are added slowly with stirring. The mixture is allowed to stand for some time during which a micro crystalline powder is precipitated. This is removed and may be washed with acetic acid, alcohol and ether and then dried. It decomposes at 250° C. Some further quantity of the product may be obtained by diluting the mother liquors after removal of the first precipitate.

Example 5

*3,3'-dinitro-5,5'-dimethyl-4,4'-diphenol isatin-(3,3)*

24 gms. of di-ortho cresol isatin are dissolved in 250 cc. of glacial acetic acid. 10 cc. of nitric acid is slowly added with stirring. The mixture develops heat and is stirred for fifteen minutes after which time it is poured into 150 cc. of cold water. The bright yellow precipitate is filtered off and washed free of acid with water. On recrystallization from alcohol the product forms a yellow crystalline powder which melts with decomposition at 238 to 240° C.

Example 6

*3,3'-dibromo-5,5'-diphenyl-4,4'-diphenol isatin-(3,3)*

31 gms. of di-ortho phenyl phenol isatin are dissolved in 300 cc. of alcohol and 20.5 gms. of bromine are added slowly with stirring. The mixture is allowed to stand for a short time and is then diluted with 1500 cc. of water. The precipitate is washed several times by decantation with water and is then filtered and washed free of acid on the filter. It may be dried in a vacuum. The product is a white powder with a melting point of 114–115° C.

Example 7

*3,3'-dinitro-5,5'-diphenyl-4,4'-diphenol isatin-(3,3)*

4.7 gms. of di-ortho phenyl phenol isatin is suspended in 25 cc. of glacial acetic acid; 1.5 cc. of nitric acid is added with stirring. The mixture is heated for a short time on the water bath to complete the reaction and is then treated with 600 cc. of water. The precipitated nitro compound is filtered off and then washed with water and may be dried in a vacuum. Recrystallization from alcohol gives a yellow powder with a melting point of 148° C.

Example 8

*3,3'-dibromo-4,4', 6,6'-diresorcin isatin-(3,3)*

7 gms. of diresorcin isatin are dissolved in 25 cc. of glacial acetic acid and a solution 6.3 gms. of bromine in 10 cc. of glacial acetic acid are slowly added with stirring. The mixture is allowed to stand for a short time and is then poured into 500 cc. of water. The precipitate of dibromo diresorcin isatin is filtered off and washed and dried at about 60° C. The product is a white powder which melts at 250–255° C. with decomposition. It is soluble in alcohol and ether and insoluble in water. Analysis shows this compound to be of the open type.

Example 9

*3,3'-dinitro-4,4', 6,6'-diresorcin isatin-(3,3)*

5 gms. of diresorcin isatin are dissolved in 20 cc. of concentrated sulfuric acid and the mixture is cooled to 0° C. To the well stirred mixture is added a previously cooled nitrating mixture of 2.8 cc. of nitric acid and 3.5 cc. of sulfuric acid, the addition being so slow that the temperature remains at about 0° C. The mixture is maintained at this temperature for one hour with stirring and is then diluted with 100 cc. of ice water. The precipitate of dinitro diresorcin isatin is filtered off, then washed with cold water and dried in a vacuum. The melting point is above 270° C. On analysis the formula was found to be $C_{20}H_{13}N_3O_8$ which shows that the compound is of the closed type.

We claim:

1. Substituted diphenol isatin derivatives having the general formula:

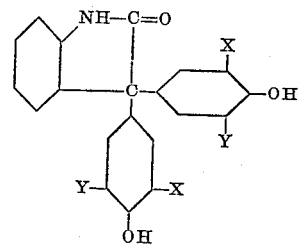

where "X" is hydrogen or an alkyl or aryl group and "Y" is bromine or the nitro group.

2. A 4,4'-di(hydroxy phenyl) isatin-(3,3) compound containing bromine or the nitro group in the 3 and 3' positions of the phenol nuclei.

3. A diresorcin isatin-(3,3) compound having one OH of each resorcin nucleus para to the isatin linkage and bromine or the nitro group in each resorcin nucleus ortho to this OH group.

4. A 5,5'-diphenyl-4,4'-diphenol isatin-(3,3) compound containing bromine or the nitro group in the 3 and 3' positions of the phenol nuclei.

5. 3,3', 5,5'-tetrabromo-4,4'-diphenol isatin-(3,3).

6. 3,3'-dinitro-5,5'-diphenyl-4,4'-diphenol isatin-(3,3).

7. 3,3'-dibromo-2,2', 4,4'-diresorcin isatin-(3,3).

WALTER G. CHRISTIANSEN.
SIDNEY E. HARRIS.